(12) United States Patent
Chang et al.

(10) Patent No.: US 6,575,193 B2
(45) Date of Patent: Jun. 10, 2003

(54) CONTROL VALVE DEVICE OF A PRESSURE TANK

(76) Inventors: Hung-Shen Chang, 58, Ma Yuan West St., Taichung (TW); Yueh-Jen Chen Jiang, 58, Ma Yuan West St., Taichung (TW)

(*) Notice: Subject to any disclaimer, the term of this patent is extended or adjusted under 35 U.S.C. 154(b) by 138 days.

(21) Appl. No.: 09/863,989

(22) Filed: May 21, 2001

(65) Prior Publication Data

US 2002/0170607 A1 Nov. 21, 2002

(51) Int. Cl.[7] .................................................. G05D 7/00
(52) U.S. Cl. ....................... 137/558; 137/592; 137/588; 137/212
(58) Field of Search ................................. 137/558, 592, 137/588, 589, 212, 209; 251/144

(56) References Cited

U.S. PATENT DOCUMENTS

| 1,297,760 | A | * | 3/1919 | Walters ....................... 137/558 |
| 2,951,502 | A | * | 9/1960 | Norway et al. ............. 137/588 |
| 5,836,483 | A | * | 11/1998 | Disel ........................... 222/396 |
| 5,901,740 | A | * | 5/1999 | Sanchelima ................. 137/392 |

* cited by examiner

Primary Examiner—A. Michael Chambers

(57) ABSTRACT

A control valve device has a valve seat having a pressure inlet hole, a first through hole communicating with the pressure inlet hole, an inflation hole, an outlet hole communicating with the inflation hole, and a second through hole communicating with the inflation hole. A non-return valve is inserted in the pressure inlet hole. A one-way check valve is inserted in the outlet hole. A safety valve is disposed on the valve seat to communicate with the inflation hole. A first nut is disposed on the valve seat. The first nut has a through aperture communicating with the pressure inlet hole. A second nut is disposed on the valve seat. A pressure pipe is inserted through the pressure inlet hole and the first through hole.

5 Claims, 7 Drawing Sheets

CONTROL VALVE DEVICE OF A PRESSURE TANK

BACKGROUND OF THE INVENTION

The present invention relates to a control valve device of a pressure tank. More particularly, the present invention relates to a control valve device of a pressure tank which has a pressure pipe inserted in the pressure tank.

A conventional control valve device of a pressure tank has a single valve. However, an inner pressure of the pressure tank will decrease when the residual volatile liquid in the pressure tank is small.

SUMMARY OF THE INVENTION

An object of the present invention is to provide a control valve device of a pressure tank which can infuse an air into the pressure tank.

Another object of the present invention is to provide a control valve device of a pressure tank which has a liquid level indicator gauge to indicate a liquid level in the pressure tank.

Accordingly, a control valve device is disposed on a pressure tank. The control valve device comprises a valve seat, a non-return valve, a one-way check valve, and a pressure pipe. The valve seat has a pressure inlet hole, a first through hole communicating with the pressure inlet hole, an inflation hole, an outlet hole communicating with the inflation hole, and a second through hole communicating with the inflation hole. The non-return valve is inserted in the pressure inlet hole. The one-way check valve is inserted in the outlet hole. A safety valve is disposed on the valve seat to communicate with the inflation hole. A first nut is disposed on the valve seat. The first nut has a through aperture communicating with the pressure inlet hole. A second nut is disposed on the valve seat to block the inflation hole. The pressure pipe is inserted through the pressure inlet hole and the first through hole.

DETAILED DESCRIPTION OF THE INVENTION

Figure 1:
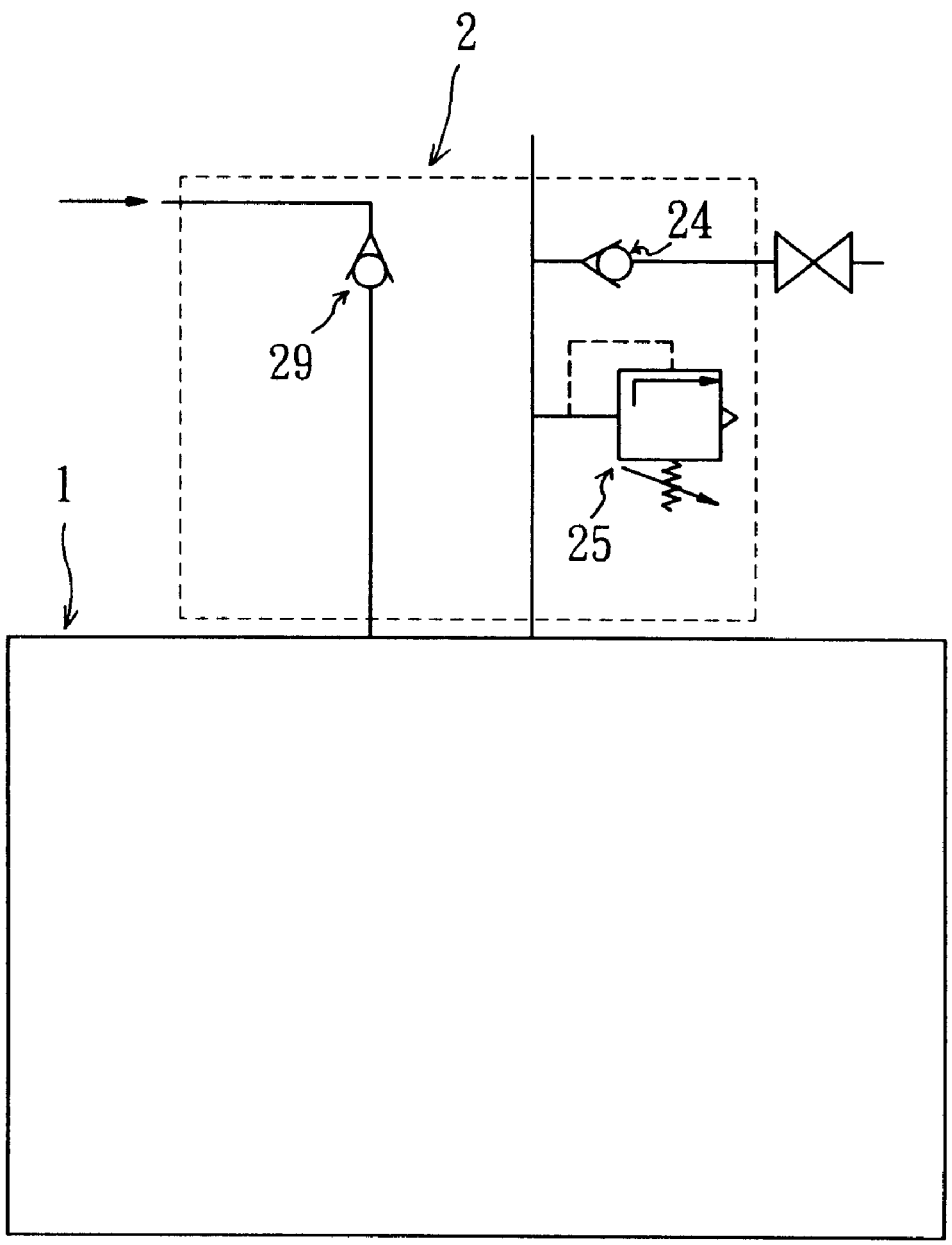
FIG. 1 is a schematic diagram of a control valve device of a pressure tank of a preferred embodiment in accordance with the present invention.
Figure 2:
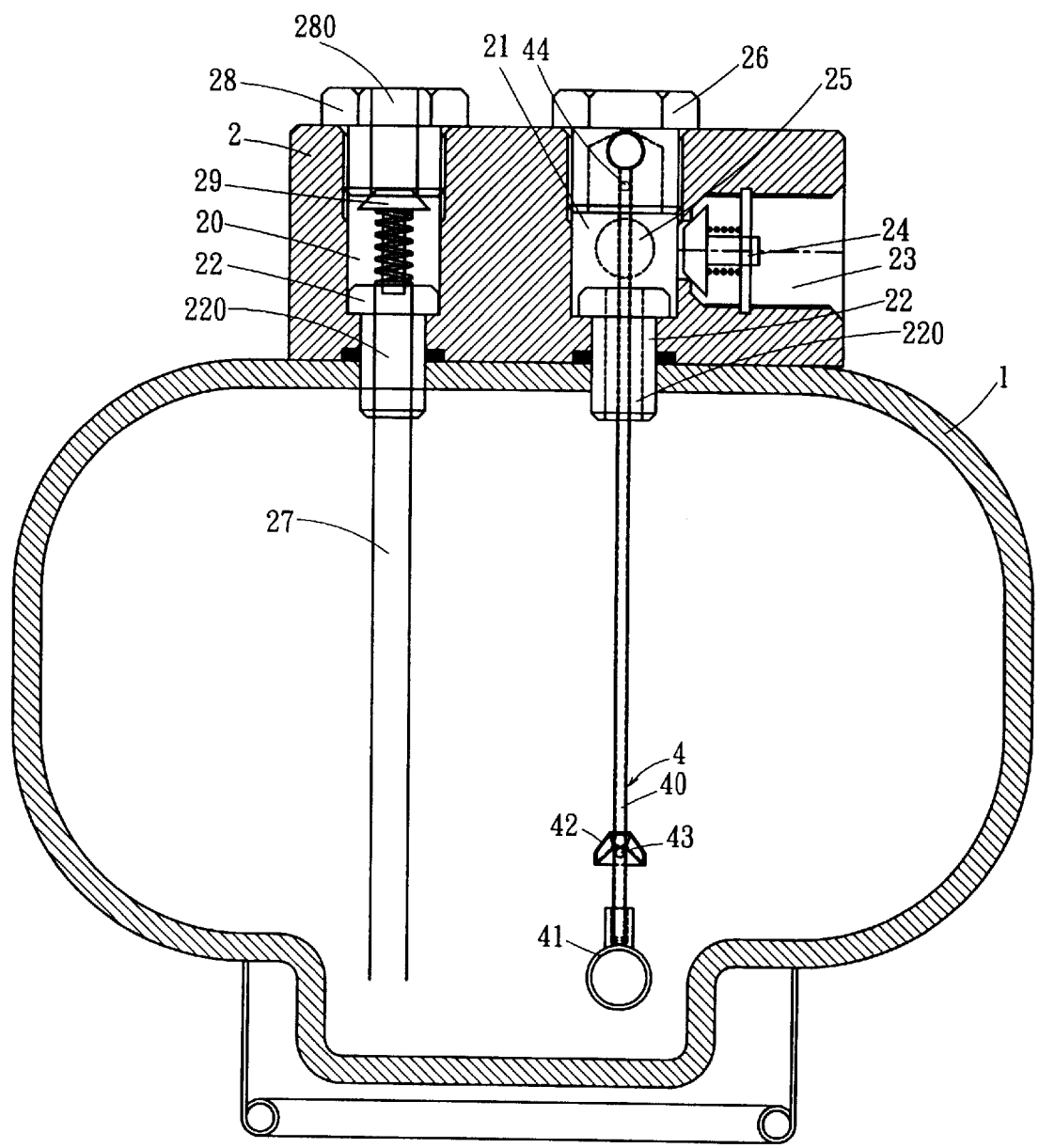
FIG. 2 is a sectional assembly view of a control valve device of a pressure tank of a preferred embodiment in accordance with the present invention.
Figure 3:
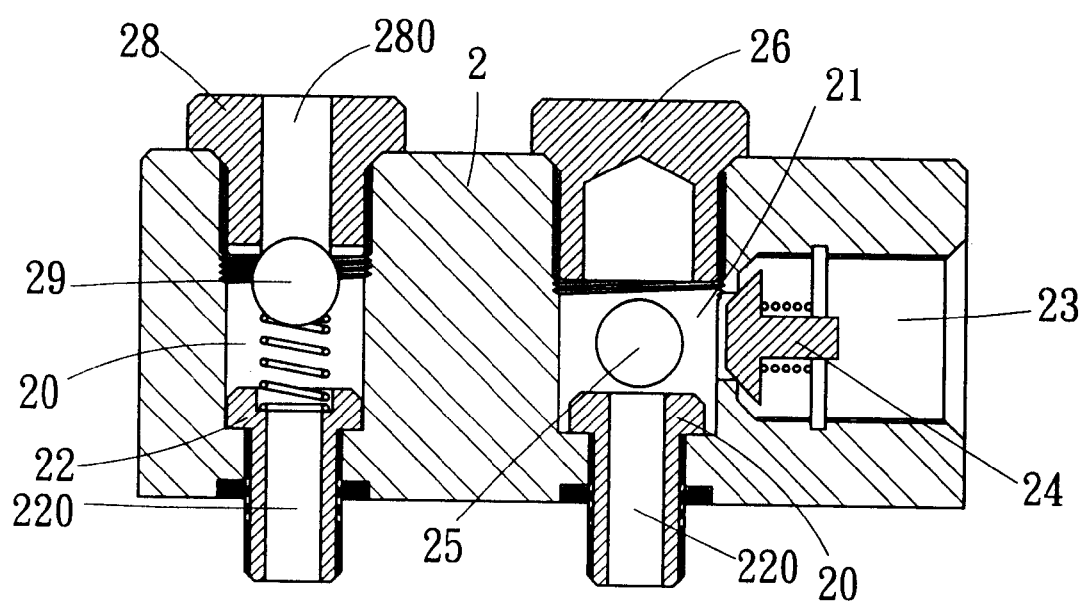
FIG. 3 is a partially sectional assembly view of a control valve device of a pressure tank of a preferred embodiment in accordance with the present invention.
Figure 3A:
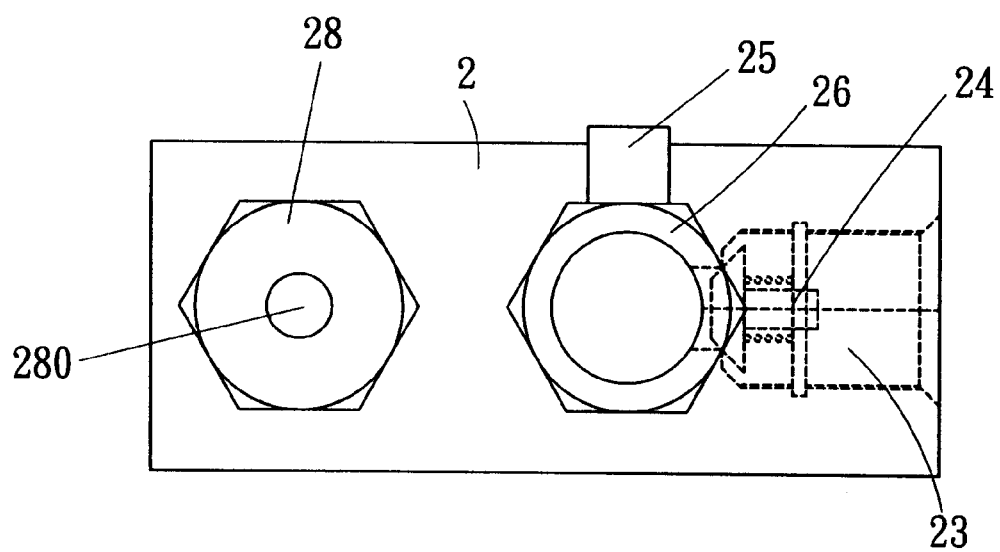
FIG. 3A is an elevational view of FIG. 3.

Referring to FIGS. 1 to 3A, a control valve device is disposed on a pressure tank 1. The control valve device comprises a valve seat 2, a non-return valve 29, a one-way check valve 24, and a pressure pipe 27.

The valve seat 2 has a pressure inlet hole 20, a first through hole 220 communicating with the pressure inlet hole 20, an inflation hole 21, an outlet hole 23 communicating with the inflation hole 21, and a second through hole 220' communicating with the inflation hole 21.

The non-return valve 29 is inserted in the pressure inlet hole 20.

The one-way check valve 24 is inserted in the outlet hole 23.

A safety valve 25 is disposed on the valve seat 2 to communicate with the inflation hole 21.

A first nut 28 is disposed on the valve seat 2. The first nut 28 has a through aperture 280 communicating with the pressure inlet hole 20.

A second nut 26 is disposed on the valve seat 2 to block the inflation hole 21.

The pressure pipe 27 is inserted through the pressure inlet hole 20 and the first through hole 220.

The valve seat 2 is disposed on a top portion of the pressure tank 1.

A first bolt 22 is inserted in the first through hole 220 to fasten the valve seat 2 and the pressure tank 1 together.

A second bolt 22' is inserted in the second through hole 220' to fasten the valve seat 2 and the pressure tank 1 together.

A liquid level indicator gauge 4 has a rod 40 inserted through the inflation hole 21 and the second through hole 220', a hood 42 surrounding the rod 40, and a float ball 41 disposed on a bottom of the rod 40.

An outlet aperture 44 is formed on an upper portion of the rod 40.

An inlet aperture 43 is formed on a lower portion of the rod 40.

Figure 4:
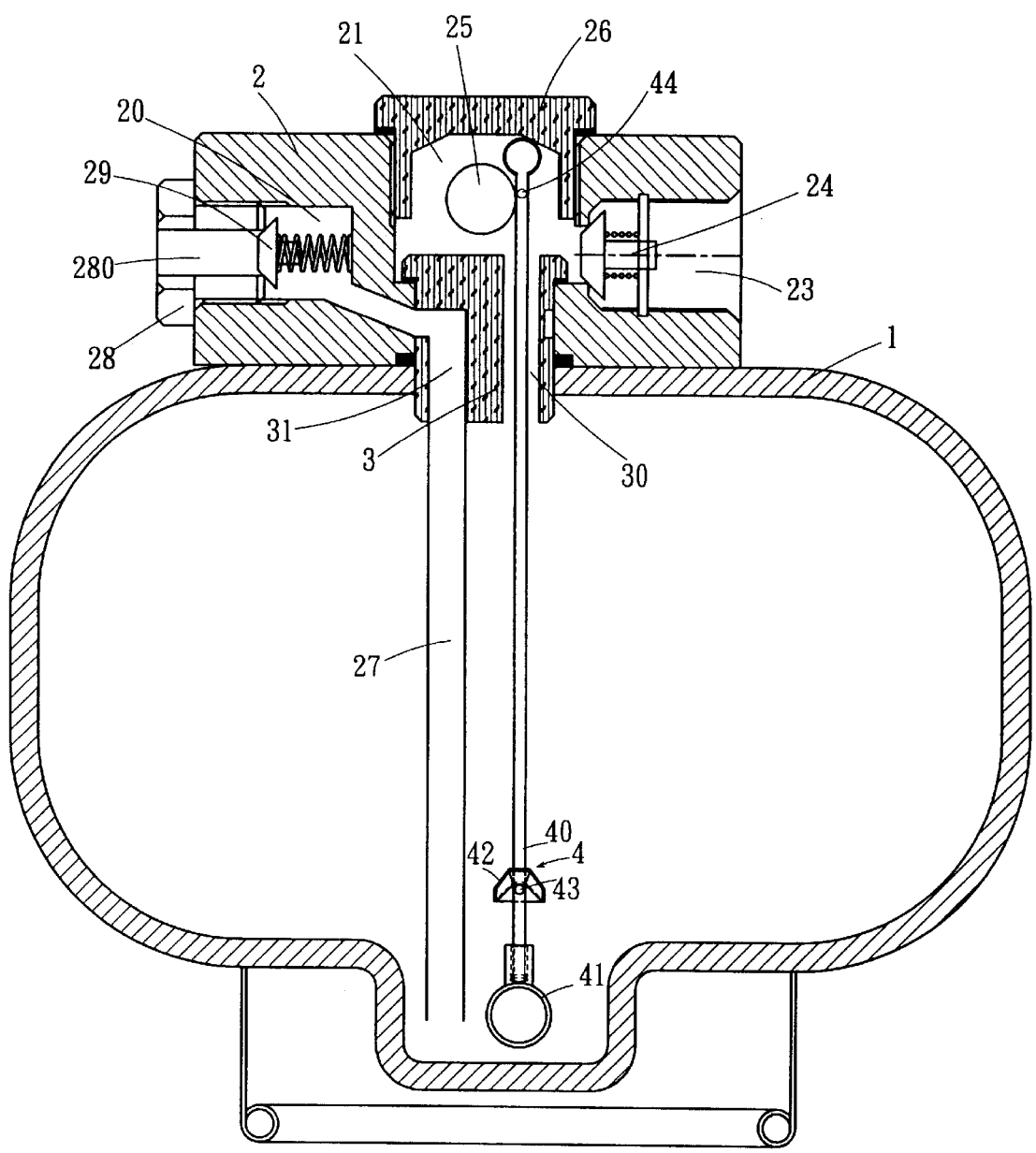
FIG. 4 is a sectional assembly view of a control valve device of a pressure tank of another preferred embodiment in accordance with the present invention.
Figure 5:
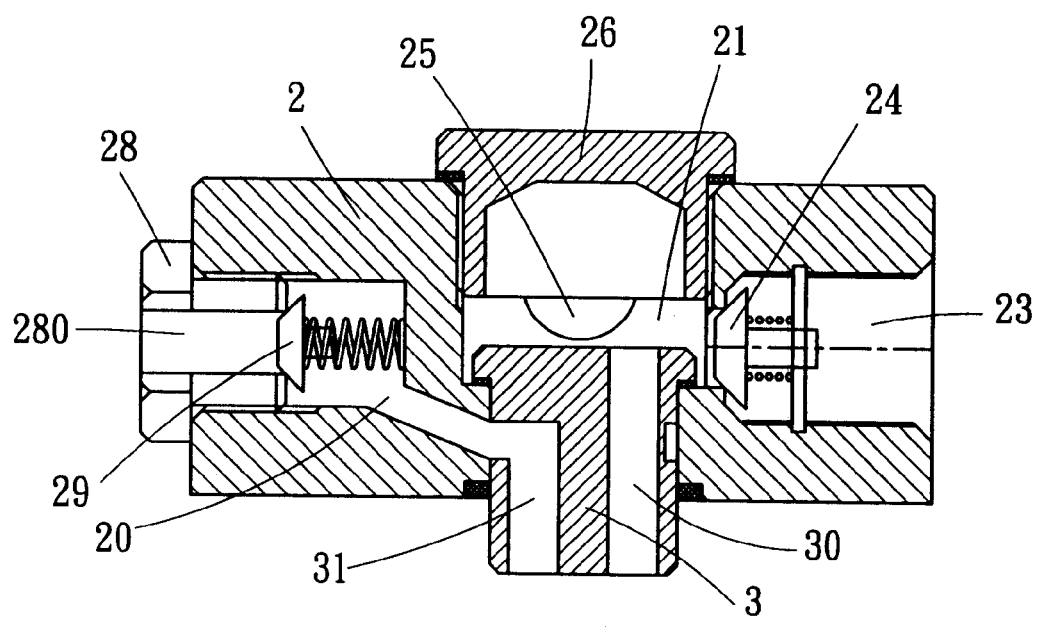
FIG. 5 is a partially sectional assembly view of a control valve device of a pressure tank of another preferred embodiment in accordance with the present invention.
Figure 5A:
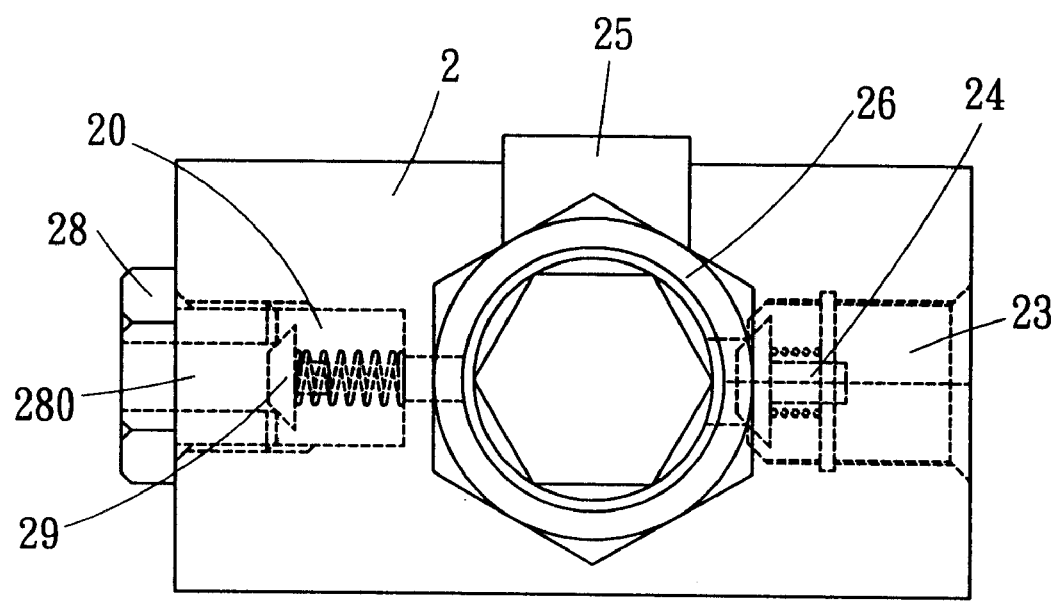
FIG. 5A is an elevational view of FIG. 5.

Referring to FIGS. 4, 5 and 5A, another control valve device is disposed on a pressure tank 1. The control valve device comprises a valve seat 2, a non-return valve 29, a one-way check valve 24, and a pressure pipe 27.

The valve seat 2 has a pressure inlet hole 20, an inflation hole 21 communicating with the pressure inlet hole 20, and an outlet hole 23 communicating with the inflation hole 21.

The non-return valve 29 is inserted in the pressure inlet hole 20.

The one-way check valve 24 is inserted in the outlet hole 23.

A safety valve 25 is disposed on the valve seat 2 to communicate with the inflation hole 21.

A first nut 28 is disposed on the valve seat 2. The first nut 28 has a through aperture 280 communicating with the pressure inlet hole 20.

A second nut 26 is disposed on the valve seat 2 to block the inflation hole 21.

The valve seat 2 is disposed on a top portion of the pressure tank 1.

A screw 3 fastens the valve seat 2 and the pressure tank 1 together.

The screw 3 has a first through bore 30 and a second through bore 31.

The pressure pipe 27 is inserted through the second through bore 31.

A liquid level indicator gauge 4 has a rod 40 inserted through the first through bore 30, a hood 42 surrounding the rod 40, and a float ball 41 disposed on a bottom of the rod 40.

An outlet aperture 44 is formed on an upper portion of the rod 40.

An inlet aperture 43 is formed on a lower portion of the rod 40.

The present invention is not limited to the above embodiments but various modification thereof may be made. Furthermore, various changes in form and detail may be made without departing from the scope of the present invention.

We claim:

1. A control valve device disposed on a pressure tank, and the control valve device comprising:

a valve seat, a non-return valve, a one-way check valve, and a pressure pipe, the valve seat having a pressure inlet hole, a first through hole communicating with the pressure inlet hole, an inflation hole, an outlet hole communicating with the inflation hole, and a second through hole communicating with the inflation hole, the non-return valve inserted in the pressure inlet hole, the one-way check valve inserted in the outlet hole, a safety valve disposed on the valve seat to communicate with the inflation hole, a first nut disposed on the valve seat, the first nut having a through aperture communicating with the pressure inlet hole, a second nut disposed on the valve seat to block the inflation hole, and the pressure pipe inserted through the pressure inlet hole and the first through hole.

2. The control valve device as claimed in claim 1, wherein a first bolt is inserted in the first through hole to fasten the valve seat and the pressure tank together, and a second bolt is inserted in the second through hole to fasten the valve seat and the pressure tank together.

3. The control valve device as claimed in claim 1, wherein a liquid level indicator gauge has a rod inserted through the inflation hole and the second through hole, and a float ball disposed on a bottom of the rod.

4. The control valve device as claimed in claim 1, wherein a hood surrounds the rod.

5. The control valve device as claimed in claim 1, wherein an outlet aperture is formed on an upper portion of the rod, and an inlet aperture is formed on a lower portion of the rod.

* * * * *